No. 734,588. PATENTED JULY 28, 1903.
C. MILLER.
WHEEL.
APPLICATION FILED OCT. 3, 1900.
NO MODEL.
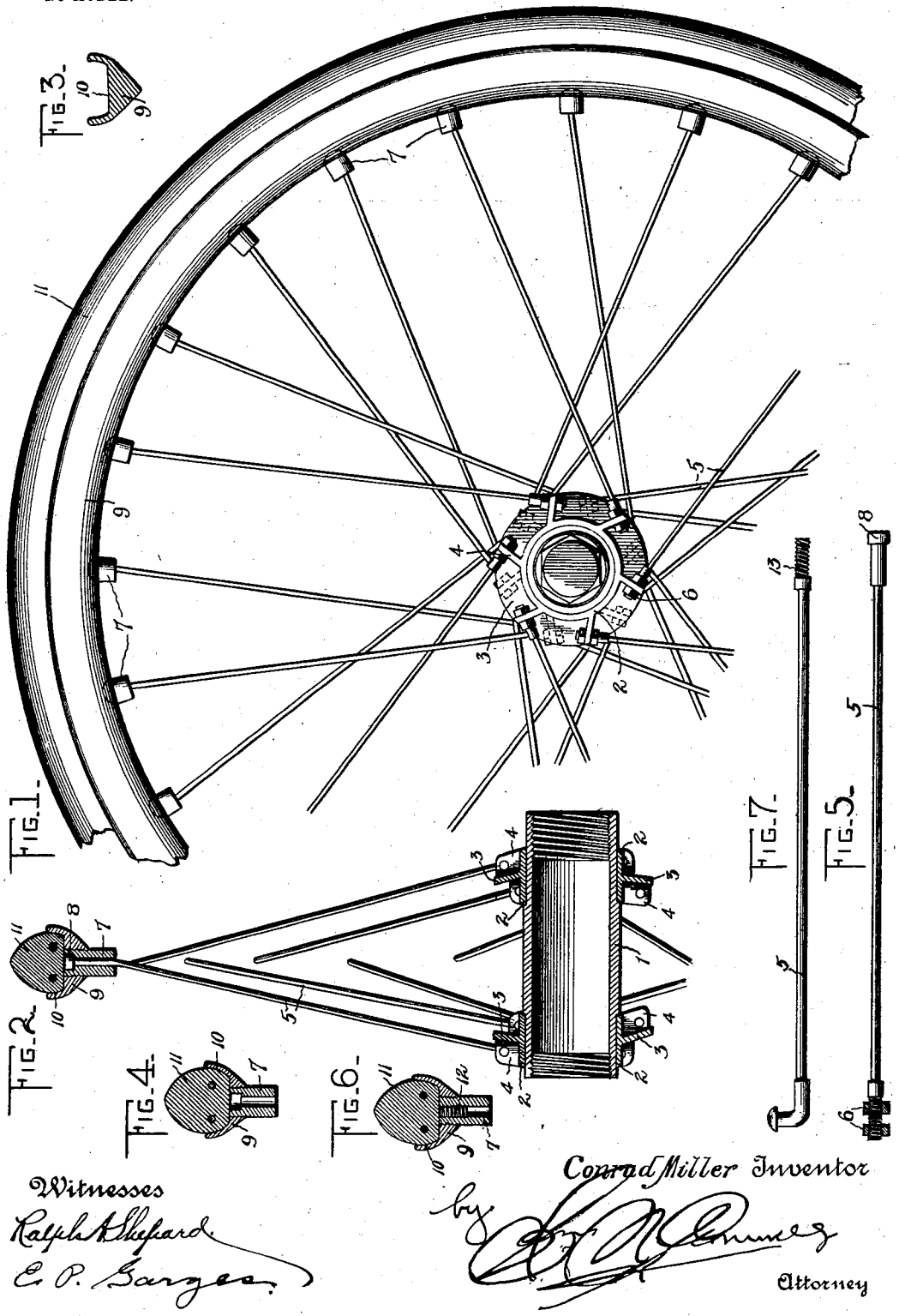
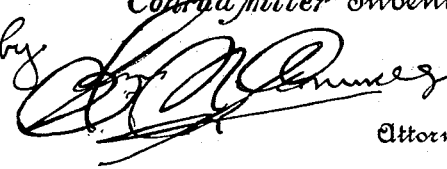
Witnesses
Ralph A. Shepard
E. P. Barger
Conrad Miller Inventor
by
Attorney
THE NORRIS PETERS CO., PHOTO-LITHO., WASHINGTON, D. C.

No. 734,588. Patented July 28, 1903.

UNITED STATES PATENT OFFICE.

CONRAD MILLER, OF LEADVILLE, COLORADO.

WHEEL.

SPECIFICATION forming part of Letters Patent No. 734,588, dated July 28, 1903.

Application filed October 3, 1900. Serial No. 31,889. (No model.)

*To all whom it may concern:*

Be it known that I, CONRAD MILLER, a citizen of the United States, residing at Leadville, in the county of Lake and State of Colorado, have invented certain new and useful Improvements in Wheels and Bearings Therefor; and I do hereby declare the following to be a full, clear, and exact description of the invention, such as will enable others skilled in the art to which it appertains to make and use the same.

This invention relates to improvements in wheels and bearings therefor.

The object of the present invention is the provision of a wheel which is extremely light in construction, but possessing high merits in point of durability and strength, and it is also the aim of the invention to provide a wheel wherein the spokes are so arranged that the same will always remain under the requisite degree of tension necessary for the proper running of the wheel and which spokes when injured or broken may be quickly and easily removed and replaced by others without the necessity of disturbing the other parts of the wheel or removing the tire from the rim.

With these and other objects in view, which will appear as the nature of the improvements is better understood, the invention consists, substantially, in the novel construction, combination, and arrangement of parts, as will be hereinafter fully described, illustrated in the accompanying drawings, and pointed out in the appended claims.

In the drawings, Figure 1 is a side elevation, partly broken away, of a wheel constructed in accordance with the present invention. Fig. 2 is a vertical transverse sectional view thereof, also partly broken away. Fig. 3 is a transverse sectional view of the wheel-rim, taken at a point between the spoke-nipples. Fig. 4 is a transverse sectional view of the rim and tire and illustrating the preferred form of spoke-nipple. Fig. 5 is a side elevation of one of the spokes employed in connection with the nipple shown in Fig. 4. Fig. 6 is a view similar to Fig. 4 and illustrating another form of spoke-nipple. Fig. 7 is a view similar to Fig. 5, illustrating a form of spoke employed in connection with the form of nipple shown in Fig. 6.

Referring to the drawings, and more particularly to Figs. 1 and 2 thereof, the numeral 1 designates the hub of a wheel, which hub is of uniform diameter throughout its length at its interior; but the ends of said hub at its exterior are turned down, as clearly shown in Fig. 2. Mounted upon each of said ends and fixedly secured thereto is a spoke-securing sleeve 2, which sleeve is provided with an outwardly-extending inwardly-inclined flange 3, having at opposite sides radially-arranged tangential ribs 4. It will be observed, however, that the ribs at one side of the flange 3 incline in the same direction, but in a reverse direction to the ribs at the other side of said flange, and fitting within each of the ribs 4 is a spoke 5. It will also be observed, as clearly shown in Fig. 1, that the points of connection of the ribs 4 with the sleeves 2 are such as to place the ribs at one side of each of the flanges 3 approximately opposite the ribs at the opposite side thereof, so that said ribs are thereby arranged in pairs, one rib of each pair being inclined in a direction opposite to the direction of inclination of the other rib of the pair. By reason of this the spokes 5, which are connected to the ribs of each pair, also extend in opposite directions, and the strain of each spoke exerted upon the hub at the point of connection of the rib to which such spoke is connected is offset by the strain of the spoke connected to the rib directly opposite. Thus the spokes 5, being arranged in pairs, equalize the strain upon the hub, and, moreover, by inclining the ribs, as shown, or tangentially to the hub, the ribs effectually resist the strain exerted on them and are less liable to fracture. The ends of the spokes 5, which pass through the ribs 4, are screw-threaded, and mounted upon said threaded ends and embracing the ribs 4 are jam-nuts 6, said nuts being arranged in pairs upon each of the spokes 5. The outer end of each of the spokes 5 fits within a nipple 7, and, as shown in Fig. 2, the extreme outer end of each of said spokes terminates in an enlarged head 8, which fits within a countersunk portion of the nipple 7. The nipple 7 is exteriorly screw-threaded, so as to fixedly engage a rim 9, and said rim is substantially V-shaped in cross-section and provided at its outer face with a cavity 10, which receives a tire 11. The tire 11 is preferably of rubber and of the solid type and is secured in the cavity 10 through any of the well-known fastening means now employed, and by the employment of the nipples 7 it is apparent that should any of the spokes 5 become fractured, thus necessitating their removal, such may be accomplished by simply unscrewing the nipple 7, and thereby disengaging the same from the rim 9, whereupon a new spoke may be inserted without disturbing the other spokes or removing the tire 11 from said rim. By forming the rim 9 of a substantially V shape the same is not liable to lift water, mud, &c., as in the ordinary construction of flat rims.

If desired, the form of nipple and spoke shown in Figs. 6 and 7 may be substituted for that shown in Figs. 2, 4, and 5, and, as shown in Figs. 6 and 7, the nipple 7 is substantially the same as shown in Figs. 2 and 4, excepting that the bore thereof is screw-threaded, as at 12, in order to receive the threaded end 13 of the spoke 5. The screw-threads 12 run in opposite direction to the screw-threads upon the exterior of the nipple, so that when the nipple 7 is screwed into the rim the threaded end 13 of the spoke 5 will be screwed into said nipple, and by reason of this construction it is apparent that the spoke may be easily tensioned without the employment of other means than the nipple 7, while in Figs. 1, 2, 4, and 5 tensioning of the spokes is accomplished by means of the nuts 6. In Fig. 7 the manner of connecting the spoke 5 to the hub is of the ordinary construction.

The forms herein shown and described are what are believed to be preferable embodiments of the invention; but as the same are susceptible of various changes in the form, proportion, and minor details of construction the right is reserved to modify or vary the invention as falls within the spirit and scope thereof.

Having thus described the invention, what is claimed as new, and desired to be secured by Letters Patent, is—

1. In a wheel, the combination with the hub, of spoke-securing sleeves arranged thereon and each provided with an annular flange, said flange being provided at each of its sides with ribs extending tangentially to said hub, the ribs at one side being approximately opposite the ribs at the other side, whereby said ribs are arranged in pairs, one of the ribs of each pair being inclined in a direction reverse to the direction of inclination of the other rib, a rim, and spokes extending from said rim and connected to said ribs, whereby said spokes are also arranged in pairs, one of the spokes of each pair extending in a direction reverse to the direction of the other spoke thereof.

2. In a wheel, the combination with the hub, of spoke-securing sleeves arranged thereon and each provided with an annular flange, said flange being provided at each of its sides with ribs extending tangentially to said hub, the ribs at one side being approximately opposite the ribs at the other side, whereby said ribs are arranged in pairs, one of the ribs of each pair being inclined in a direction reverse to the direction of inclination of the other rib, a rim, spokes extending from said rim and connected to said ribs, whereby said spokes are also arranged in pairs, one of the spokes of each pair extending in a direction reverse to the direction of the other spoke thereof, and means for tensioning said spokes.

3. In a wheel, the combination with the hub, of spoke-securing sleeves arranged thereon and each provided with an annular flange, said flange being provided at each of its sides with ribs extending tangentially to said hub, the ribs at one side being approximately opposite the ribs at the other side, whereby said ribs are arranged in pairs, one of the ribs of each pair being inclined in a direction reverse to the direction of inclination of the other rib, a rim, spokes extending from said rim and connected to said ribs, whereby said spokes are also arranged in pairs, one of the spokes of each pair extending in a direction reverse to the direction of the other spoke thereof, means for tensioning said spokes, and jam-nuts carried by said spokes for connecting and locking the latter to said ribs.

4. In a wheel, the combination with the hub, of spoke-securing sleeves arranged thereon and each provided with an annular flange, said flange being provided at each of its sides with ribs extending tangentially to said hub, the ribs at one side being approximately opposite the ribs at the other side, whereby said ribs are arranged in pairs, one of the ribs of each pair being inclined in a direction reverse to the direction of inclination of the other rib, a rim, nipples fitted in said rim, and spokes fitted in said nipples and connected to said ribs, whereby said spokes are also arranged in pairs, one of the spokes in each pair extending in a direction reverse to the direction of the other spoke thereof.

5. In a wheel, the combination with the hub, of spoke-securing sleeves arranged thereon and each provided with an annular flange, said flange being provided at each of its sides with ribs extending tangentially to said hub, the ribs at one side being approximately opposite the ribs at the other side, whereby said ribs are arranged in pairs, one of the ribs of each pair being inclined in a direction reverse to the direction of inclination of the other rib, a rim, nipples fitted in said rim, spokes fitted in said nipples and connected to said ribs, whereby said spokes are also arranged in pairs, one of the spokes of each pair extending in a direction reverse to the direction of the other spoke thereof, and jam-nuts carried by said spokes for connecting and locking the latter to said ribs.

In testimony whereof I affix my signature in the presence of two witnesses.

CONRAD MILLER.

Witnesses:
HENRY R. PENDERY,
JOHN LAW.